United States Patent [19]

Vosper

[11] Patent Number: 4,534,627
[45] Date of Patent: Aug. 13, 1985

[54] SUNGLASSES PIVOTALLY MOUNTED ON BROWBAR OF SPECTACLE FRAME

[76] Inventor: George W. Vosper, 149 Earl St., Kingston, Ontario, Canada, K7L 2H3

[21] Appl. No.: 402,049

[22] Filed: Jul. 26, 1982

[51] Int. Cl.³ .............................................. G02C 7/08
[52] U.S. Cl. ........................................ 351/47; 351/57
[58] Field of Search ....................... 351/47, 48, 57, 58, 351/59

[56] References Cited

U.S. PATENT DOCUMENTS 3,171,134  3/1965  Kennedy .......................... 351/47 X
3,413,057 11/1968  Carmichael ....................... 351/57 X Primary Examiner—Rodney B. Bovernick
Attorney, Agent, or Firm—Stanley E. Johnson

[57] ABSTRACT

Clip-on sunglasses for spectacles having frames with a browbar non-circular in cross-section and including a pair of light-weight colored transparent plates interconnected by a bridge plate having a generally C-shaped clip formed integrally therewith. The browbar, preferably square in cross-sectional shape, and the inner surface of the clip are correspondingly shaped. The clip provides means for detachably mounting the sunglasses on the spectacle frames as well as means for pivoting the sunglasses when mounted on the spectacle frames. The square shape of the browbar effectively provides a lock for the pivot in the two different positions.

3 Claims, 2 Drawing Figures

SUNGLASSES PIVOTALLY MOUNTED ON BROWBAR OF SPECTACLE FRAME

FIELD OF THE INVENTION

This invention relates to an improvement in clip-on sunglasses.

BACKGROUND OF THE INVENTION

Clip-on sunglasses are known, one type of which is disclosed in Canadian Pat. No. 215,624 issued Feb. 7, 1922 to C. E. Leonard. The coloured, flexible transparent plates are attached to the spectacle frames by lugs on the plates that engage the periphery of the frame holding the normal eyeglass lens.

Another known clip-on type sunglass consists of a pair of coloured, flexible transparent plates interconnected by a bridge and having a clip for removably mounting the plates on the frame of spectacles. The clip is attached to the coloured plates by way of a hinge such that the sunglasses can be pivoted to overlie the lenses of the spectacles or project forwardingly therefrom to provide a sunshade.

SUMMARY OF THE INVENTION

An object of the present invention is to provide an improvement in the latter type of clip-on sunglasses and more particularly simplify the means of hingedly mounting the clip-on sunglasses to the spectacle frames.

BRIEF DESCRIPTION OF THE DRAWINGS

The invention is illustrated by way of example in the accompanying drawings wherein.

DESCRIPTION OF THE PREFERRED EMBODIMENT

Figure 1:
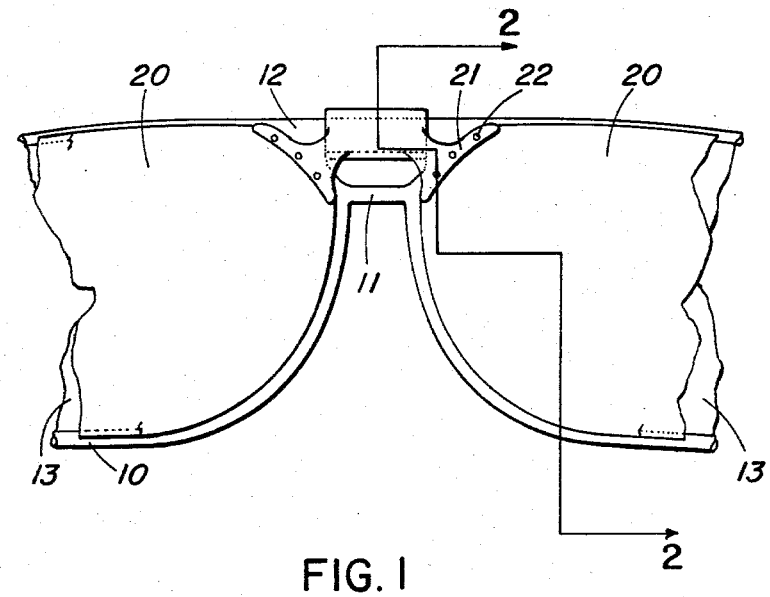
FIG. 1 is a fragmentary front elevational view of spectacles having sunglasses pivotally attached thereto in accordance with the present invention.

Referring to the drawings there is illustrated in FIG. 1 a spectacle frame 10 provided with a bridge 11, browbar 12 and a pair of lenses 13. The sunglasses consist of a pair of coloured, transparent, flexible plates 20 attached to a bridge 21 as for example by pins 22. A clip 23, formed integrally with the bridge 21, projects rearwardly and has a gap 24 to receive the browbar 12 and thereby detachably mount the sunglasses on the spectacles. The browbar 12 is substantially square in cross-sectional shape, the corners as at 12A being rounded to facilitate pivoting of the sunglasses on the browbar. The inner surface 25 of the clip corresponds essentially to the outer peripheral shape of the browbar.

Figure 2:
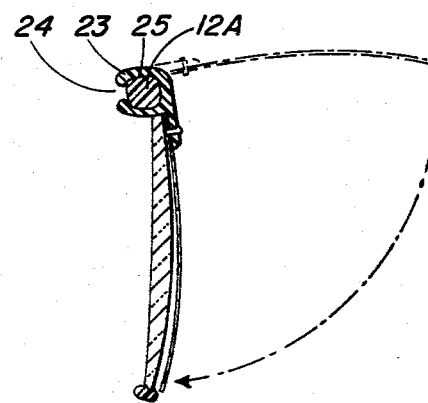
FIG. 2 is a stepped sectional view taken along line 2—2 of FIG. 1.

In FIG. 2 the sunglasses are shown in solid lines overlying the lenses of the spectacles and in broken line pivoted to project outwardly therefrom providing a sunshade. The square cross-sectional shape of the browbar effectively provides a lock for the pivot at each of the two different positions, in one position ensuring the sunglasses are pressed tightly against the frame of the spectacles and in the other position ensuring they remain in their pivoted upward position. The bridge 21 and clip 23 formed integrally therewith provides a combined means of detachably mounting the sunglasses on the spectacle frames as well as a pivot means for pivoting the sunglasses on the spectacle frames.

In the foregoing the browbar is described as having a square cross-sectional shape. Essentially the browbar is non-circular in cross-sectional shape with the inner surface of the clip corresponding thereto and arranged so that the pivot lock means is provided at appropriate positions retaining the sunglasses overlying the lenses of the specific frames in one position and projecting from the frames in another position. The cross-sectional shape of the browbar, for example, may be octagonal, hexagonal, or square, the latter being preferred.

In the drawing, and the foregoing description, the clip 23 snapes onto browbar 12. Some spectacle frames however do not have a browbar. In that case clip 23 could snap onto the equivalent of bridge 11 (or nose piece) providing both are appropriately shaped to provide the foregoing described pivot action and locking feature.

I claim:

1. The combination of spectacles having lenses and sunglasses attached to said spectacles, said spectacles having a browbar non-circular in outline cross-sectional shape and said sunglasses being pivotally and detachably connected to said browbar, said sunglasses comprising a pair of light-weight, colored, transparent plates, a bridge plate and means securing the transparent plates to the bridge plate; said bridge plate having a generally C-shaped clip formed integrally therewith detachably and pivotally mounting the sunglasses on the browbar of the spectacles, said clip having an inner surface corresponding essentially in outline configuration to the cross-sectional shape of the browbar and together cooperating to restrain pivotal movement of the sunglasses at each of two different pivotal positions of the sunglasses, one position being where the sunglass transparent plates overlie the lenses of the spectacles and the other where they project forwardly.

2. The combination of claim 1 wherein said browbar is essentially square in cross-sectional shape.

3. The combination as defined in claim 2, wherein the browbar has rounded corners.

* * * * *